(12) United States Patent
Koo

(10) Patent No.: US 9,294,594 B2
(45) Date of Patent: Mar. 22, 2016

(54) METHOD AND APPARATUS FOR TRANSMITTING DATA AND METHOD AND APPARATUS FOR PROCESSING DATA

(75) Inventor: Min-soo Koo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 13/352,970

(22) Filed: Jan. 18, 2012

(65) Prior Publication Data

US 2012/0185562 A1    Jul. 19, 2012

(30) Foreign Application Priority Data

Jan. 18, 2011  (KR) .................. 10-2011-0005006

(51) Int. Cl.
| | | |
|---|---|---|
| G06F 15/16 | (2006.01) | |
| H04L 29/08 | (2006.01) | |
| G06F 9/54 | (2006.01) | |
| H04W 4/18 | (2009.01) | |

(52) U.S. Cl.
CPC ............... *H04L 69/32* (2013.01); *G06F 9/541* (2013.01); *H04W 4/185* (2013.01)

(58) Field of Classification Search
None
See application file for complete search history.

(56) References Cited

U.S. PATENT DOCUMENTS

| | | | |
|---|---|---|---|
| 6,434,604 B1 * | 8/2002 | Harada et al. .................. 709/207 |
| 8,151,183 B2 | 4/2012 | Chen | |
| 8,374,636 B2 * | 2/2013 | McDonough .................. 455/466 |
| 2005/0120122 A1* | 6/2005 | Farnham ........................ 709/230 |
| 2006/0265716 A1* | 11/2006 | Claussen et al. ............... 719/315 |
| 2008/0263052 A1* | 10/2008 | Parsell et al. .................... 707/10 |
| 2008/0307233 A1* | 12/2008 | Calman ......................... 713/179 |
| 2010/0010738 A1* | 1/2010 | Cho .............................. 701/208 |
| 2010/0131753 A1* | 5/2010 | Ha ................................ 713/153 |
| 2010/0202451 A1* | 8/2010 | Glover et al. ................... 370/389 |
| 2011/0016185 A1* | 1/2011 | Zwaal et al. ................... 709/206 |
| 2011/0087709 A1* | 4/2011 | Sriram .......................... 707/803 |
| 2011/0131412 A1* | 6/2011 | Grimsley et al. .............. 713/168 |
| 2012/0083285 A1* | 4/2012 | Shatsky et al. ............. 455/456.1 |

FOREIGN PATENT DOCUMENTS

CN         101055577 A    10/2007

OTHER PUBLICATIONS

Java.net "Early Access Program for FireStorm/SDO: Implementing the SDO API" Jan. 31, 2006.*
Communication dated Jan. 21, 2016 issued by The State Intellectual Property Office of P.R. China in counterpart Chinese Patent Application No. 201210021181.7.

* cited by examiner

*Primary Examiner* — Joshua Joo
*Assistant Examiner* — Younes Naji
(74) *Attorney, Agent, or Firm* — Sughrue Mion, PLLC

(57) ABSTRACT

A method of transmitting data and a method of processing data, the methods including acquiring basic data of a type defined in the open API and extended data of a type not defined in the open API; converting the extended data to data of a type defined in the open API; and invoking the open API and transmitting the basic data and the converted extended data to the server.

7 Claims, 8 Drawing Sheets

FIG. 3

```
                                                          300
┌─────────────────────────────────────────────────────────┐
│ Request                                                 │
│ HTTP Post : openapi.calendardemo.com/mycalendar (310)   │
│ BODY                                                    │
│ <?xml version = "1.0" encoding = "utf-8"?>              │
│ <event>                                                 │
│ <title>Test Title</title> (320)                         │
│ <startTime>2010-06-01T13:00:00</startTime> (330)        │
│ <endTime>2010-06-01T14:00:00</endTime> (340)            │
│ <where>School ##G#36_23413#126_3231</where> (350)       │
│ </event>                                                │
└─────────────────────────────────────────────────────────┘
```

FIG. 4

```
                                                          410
┌─────────────────────────────────────────────────────────┐
│ Request :                                               │
│ HTTP get : http://openapi.calendardemo.com/mycalendar?title=Test+Title │
└─────────────────────────────────────────────────────────┘
                                                          420
┌─────────────────────────────────────────────────────────┐
│ Response :                                              │
│ BODY                                                    │
│ <?xml version = "1.0" encoding = "utf-8"?>              │
│ <event>                                                 │
│ <title>Test Title</title> (421)                         │
│ <startTime>2010-06-01T13:00:00</startTime> (422)        │
│ <endTime>2010-06-01T14:00:00</endTime> (423)            │
│ <where>School ##G#36_23413#126_3231</where> (424)       │
└─────────────────────────────────────────────────────────┘
```

METHOD AND APPARATUS FOR TRANSMITTING DATA AND METHOD AND APPARATUS FOR PROCESSING DATA

CROSS-REFERENCE TO RELATED PATENT APPLICATION

This application claims the benefit of Korean Patent Application No. 10-2011-0005006, filed on Jan. 18, 2011, in the Korean Intellectual Property Office, the disclosure of which is incorporated herein in its entirety by reference.

BACKGROUND

1. Field

The disclosed teachings relate to a method and an apparatus for transmitting data and a method and an apparatus for processing data, and more particularly, to a method and an apparatus for transmitting data by using an open application programming interface (API) and a method and an apparatus for processing received data by using an open API.

2. Description of the Related Art

Today, service providers operating servers publish APIs by which a client may store data in the servers or access data stored in the servers. Such an API published by a service provider is referred to as an open API.

Data transmitted or received via an open API shall comply with open API standards or standards set by a service provider.

SUMMARY

The disclosed teachings provide a method and an apparatus for transmitting data and a method and an apparatus for processing data, the methods and the apparatus complying with open application programming interface (API) standards and providing various functions.

According to an aspect of exemplary embodiments, there is provided a method of transmitting data to a server by using an open application programming interface (API), the method including acquiring basic data of a type defined in the open API and extended data of a type not defined in the open API; converting the extended data to data of a type defined in the open API; and invoking the open API and transmitting the basic data and the converted extended data to the server.

The method may further include generating a message by adding the extended data to the basic data, wherein the step of transmitting the basic data and the converted extended data may include transmitting the message.

The step of generating a message may include adding identification information for distinguishing the basic data and the extended data to the extended data.

The basic data may be processed by a first module, and the extended data may be processed by a second module.

The step of generating a message may include adding identification information regarding the second module for processing the extended data to the extended data.

According to another aspect of exemplary embodiments, there is provided a method of processing data received by using an open API, the method including invoking the open API and receiving data from a server; separating basic data of a type defined in the open API and extended data of a type not defined in the open API from the received data; and processing the basic data and the extended data.

The step of receiving data may include invoking the open API and receiving a message generated by adding the extended data to the basic data.

The step of separating basic data and extended data may include separating extended data based on identification information for distinguishing the basic data and the extended data.

In the step of processing basic data and extended data, the basic data may be processed by a first module, and the extended data may be processed by a second module.

The step of processing basic data and extended data may include acquiring identification information regarding the second module from the extended data.

According to another aspect of exemplary embodiments, there is provided a device for transmitting data to a server by using an open API, the device including an acquiring unit for acquiring basic data of a type defined in the open API and extended data of a type not defined in the open API; a converting unit for converting the extended data to data of a type defined in the open API; and a transmitting unit for invoking the open API and transmitting the basic data and the converted extended data to the server.

According to another aspect of exemplary embodiments, there is provided a device for processing data received by using an open API, the device including a receiving unit for invoking the open API and receiving data from a server; a separating unit for separating basic data of a type defined in the open API and extended data of a type not defined in the open API from the received data; and a processing unit for processing the basic data and the extended data.

BRIEF DESCRIPTION OF THE DRAWINGS

The above and other features and advantages of the disclosed teachings will become more apparent by describing in detail exemplary embodiments thereof with reference to the attached drawings in which:

FIG. 3 is a diagram showing an example of a message transmitted to a server by the data processing device according to an implementation incorporating aspects of the disclosed teachings;

FIG. 4 is a diagram showing an example of data acquired by the data processing device from a server by using an open API, according to an implementation incorporating aspects of the disclosed teachings;

DETAILED DESCRIPTION

Hereinafter, exemplary implementation incorporating the disclosed teachings will be described below in detail with reference to the attached drawings.

Figure 1:
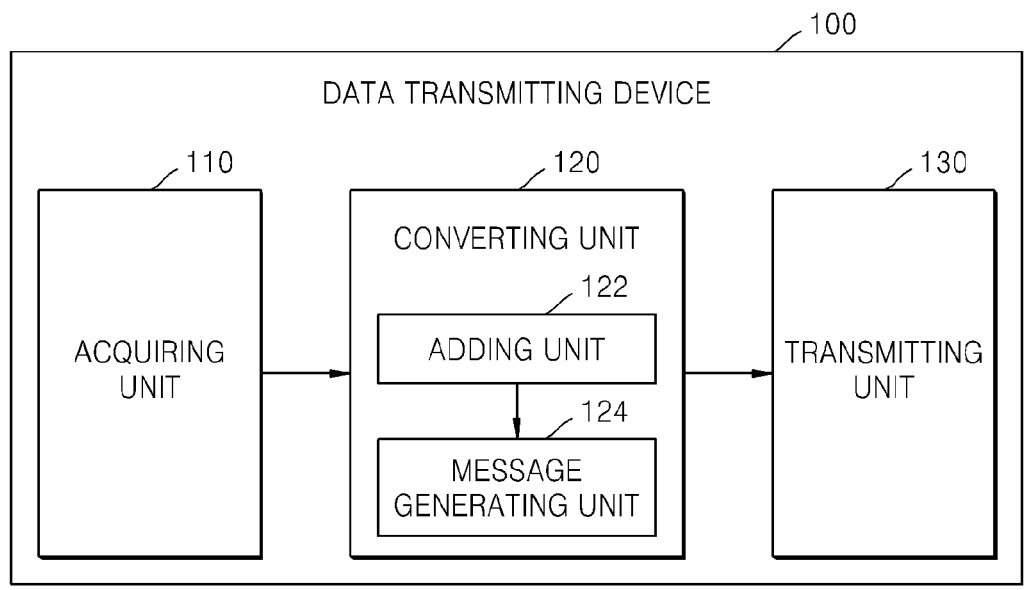
FIG. 1 is a block diagram of a data transmitting device according to an implementation incorporating aspects of the disclosed teachings.

FIG. 1 is a block diagram of a data transmitting device 100 according to an implementation incorporating aspects of the disclosed teachings.

The data transmitting device 100 includes an acquiring unit 110, a converting unit 120, and a transmitting unit 130. The data transmitting device 100 according to the present invention transmits data to a server by using an open application programming interface (API) distributed by a service provider operating the server. The service provider may publish an API, such that a client may access data provided by the server. Such a published API is referred to as an open API.

The acquiring unit 110 acquires basic data and extended data. A client transmits and receives data according to a format demanded by an open API. In particular, an open API restricts types of data to be transmitted or received, and thus it is not possible to transmit data of a type not defined by an open API. For example, it is assumed below that a client invokes an open API and transmits or receives data required for providing a schedule management service. The open API may be defined to transmit data corresponding to items 'title,' 'data,' and 'location.' In the present application, such data defined in the open API is referred to as basic data, whereas data not defined in the open API is referred to as extended data.

The converting unit 120 converts extended data to data of a type defined in the open API. The converting unit 120 may include an adding unit 122 and a message generating unit 124.

The adding unit 122 converts extended data to data of a type defined in the open API and adds the converted data to basic data of a same type. If data indicating coordinates (latitude, longitude) of an appointed place is not data of a type defined in the open API, the data indicating coordinates cannot be transmitted to a server. Therefore, the adding unit 122 adds the data indicating coordinates of an appointed place to data of a type defined in the open API (that is, text data corresponding to the place). If the data indicating coordinates of an appointed place is not text data, the adding unit 122 will convert the data indicating coordinates of an appointed place to text data format demanded by the open API before adding the data indicating coordinates of an appointed place to basic data.

The adding unit 122 decides a type of basic data to which extended data is to be added. The adding unit 122 may decide basic data to which extended data is to be added based on a user input or additional information regarding the extended data or may analyze extended data and decide a type of basic data to which the extended data is to be added.

In the case where extended data is added to basic data, it is necessary to define a means for distinguishing the extended data from the basic data. Therefore, the adding unit 122 may add information, which is for distinguishing extended data from basic data, to the extended data.

Various means for distinguishing extended data from basic data may be used according to embodiments. Hereinafter, three means for distinguishing extended data from basic data are suggested. However, the means suggested below are merely embodiments, and the disclosed teachings is not limited thereto.

For convenience of explanation, it is assumed that the basic data according to the example described herein is 'school,' whereas the extended data is 'G#36_23413#126_3231.' The basic data is text data related to an appointed place, whereas the extended data is latitude and longitude data related to the appointed place.

i) Extended data may be distinguished from basic data by adding a particular text string to a location at which the extended data begins. For example, a portion of a text string from a text string '##' may be considered as extended data. In this case, a text string including the basic data and the extended data will be 'school##G#36_23413#126_3231'.

ii) Locations in which to arrange basic data and extended data may be determined in advance to distinguish the extended data from the basic data. For example, the basic data may be located at the beginning of a text string, whereas the extended data may be located at the end of the text string. In this case, a text string including the basic data and the extended data will be 'school G#36_23413#126_3231.' iii) Information regarding locations of basic data and extended data may be transmitted separately from a text string including the basic data and the extended data.

According to an implementation of the disclosed teachings, a module for processing basic data may be different from a module for processing extended data. A first module may process basic data and provide text data regarding a title, an appointed time, and an appointed place to a user, whereas a second module may process extended data and indicate the appointed place on a map.

In the case where basic data and extended data are processed by different modules as described above, information regarding a module to process the extended data may be included in the extended data.

The adding unit 122 may add information regarding the second module processing extended data (e.g., identification information), to the extended data.

The message generating unit 124 generates a message for invoking an open API for transmission and reception of basic data and extended data. A message for invoking an open API may vary according to a protocol between a server and a client. For example, the message generating unit 124 may generate a message based on a HTTP protocol. An example of messages for invoking an open API for data transmission will be described below with reference to FIG. 2.

Conventionally, in the case where a client used an open API distributed by a server, only basic data of types defined in the open API may be transmitted or received. Conventionally, since an application at the side of the client may only use basic data of types defined in the open API, it was not possible to provide a function other than functions defined by the server. (For example, if a function other than functions defined by the server is desired, it is necessary to request modification of the open API, so that data of a new type may be transmitted.) However, according to the disclosed teachings, extended data used for providing a new function is converted to comply with types defined in an open API and is added to basic data and transmitted. Therefore, a client receiving a text string including the basic data and the extended data may extend functions without any additional expense.

Figure 2:
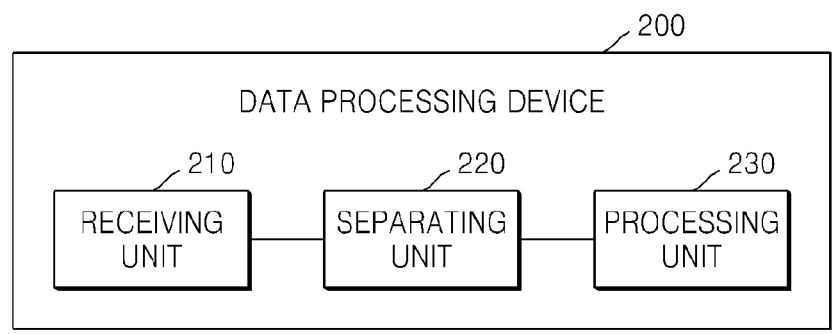
FIG. 2 is a block diagram of a data processing device according to an implementation incorporating aspects of the disclosed teachings.

FIG. 2 is a block diagram of a data processing device 200 according to an implementation of the disclosed teachings. The data processing device 200 according to the present implementation processes data received from a server by using an open API.

The data processing device 200 includes a receiving unit 210, a separating unit 220, and a processing unit 230.

The receiving unit 210 invokes an open API and receives data from a server. The data received from the server may be basic data, which is data of a type defined in the open API, plus extended data, which is data of a type not defined in the open API. For example, the receiving unit 210 may receive a message having a text string, which is generated by adding the extended data to the basic data.

The receiving unit 210 may receive data via a response message corresponding to a message for invoking an open API. A message for invoking an open API and a response message may vary according to a protocol between a server and a client. For example, when the data processing device 200 transmits a request message according to the HTTP protocol to the server, the server may transmit a response message according to the HTTP protocol.

The separating unit 220 separates basic data and extended data from data received from the server. How basic data and extended data are separated may be arranged with a server in advance or the server may inform the separating unit 220 by transmitting additional information.

For example, the separating unit 220 searches for a particular text string indicating a beginning of extended data and acquires the extended data from a location at which the particular text string is found. Alternatively, the separating unit 220 may separate basic data and extended data by using additional information indicating the location of the extended data or may acquire extended data from a predetermined location.

The processing unit 230 processes basic data and extended data. The processing unit 230 may process the basic data via the first module and process the extended data via the second module. Here, the first module and the second module may be modules for embodying separate applications. Particularly, the first module and the second module may be software modules consisting of one or more APIs, hardware modules or combinations of them.

It is assumed that according to the example described herein, the basic data is 'school,' and the extended data is coordinates information regarding the school. Within an application for providing predetermined information, the first module processes text data 'school' and displays the processed data as the name of an appointed place, whereas the second module processes coordinates information regarding the school and displays the appointed place on a map.

In the case where basic data and extended data are processed by different modules as shown above, identification information with respect to a module for processing the extended data (or, identification information with respect to an application) may be necessary. The processing unit 230 may acquire information regarding the second module by acquiring identification information included in a predetermined location of extended data.

FIG. 3 is a diagram showing an example of a message 300 transmitted to a server by the data processing device 100 according to an implementation of the disclosed teachings.

The message 300 shown in FIG. 3 is a message for invoking an open API and registering predetermined information to a server using a HTTP Post message. The message 300 is for invoking an 'openapi.calendardemo.com/mycalendar' API and transmitting predetermined information to a server. Referring to the message 300, when a user registers predetermined information of himself/herself by using the 'openapi.calendardemo.com/mycalendar' API, only text data corresponding to a title, text data corresponding to a location, and text data corresponding to a time may be transmitted to a server. In other words, the data transmitting device 100 may only transmit data indicating a title, data indicating a time, and data indicating a location.

A 'title' tag 320 in the message 300 includes text data corresponding to a title, a 'time' tag includes text data corresponding to a time, and a 'where' tag 350 includes text data corresponding to a location.

The text string included in the 'where' tag 350 is School (351)##G#36_23413#126_3231(352). The 'School' 351 is basic data indicating the name of an appointed place, whereas the '##G#36_23413#126_3231' 352 is extended data indicating longitude and latitude of the appointed place. In FIG. 3, '##' is used to distinguish extended data from basic data.

Conventionally, data of types defined in an open API may only be transmitted to a server. Therefore, in the case where a client provides a service by using data stored in the server, data of types defined in the open API may only be used, and thus it is not possible to provide various services. However, according to the disclosed teachings, various services may be provided in compliance with standards of an open API by converting extended data, adding the converted extended data to basic data, and transmitting the basic data to which the extended data is added.

FIG. 4 is a diagram showing an example of data 420 acquired by the data processing device 200 from a server by using an open API, according to an implementation incorporating aspects of the disclosed teachings.

First, the data processing device 200 generates a request message 410, which requests predetermined information by using a HTTP get command, and transmits the request message 410 to a server. The data processing device 200 invokes an 'openapi.calendardemo.com/mycalendar' API and requests the predetermined information.

The server receives the request message 410, generates a response message 420 including the predetermined information, and transmits the response message 420 to the data processing device 200. The response message 420 includes a 'title' tag 421 including data corresponding to a title, a 'starttime' tag 422 and an 'endtime' tag 423 including data corresponding to an appointed time, and a 'where' tag 424 including data corresponding to an appointed place.

The text string included in the 'where' tag 424 is 'School ##G#36_23413#126_3231'. The data processing device 200 detects '##' from the text string, separates data located prior to the '##' as basic data, and separates data located after the '##' as extended data. The data processing device 200 processes the basic data via the first module, processes the extended data via the second module, and outputs the processed data.

Figure 5:
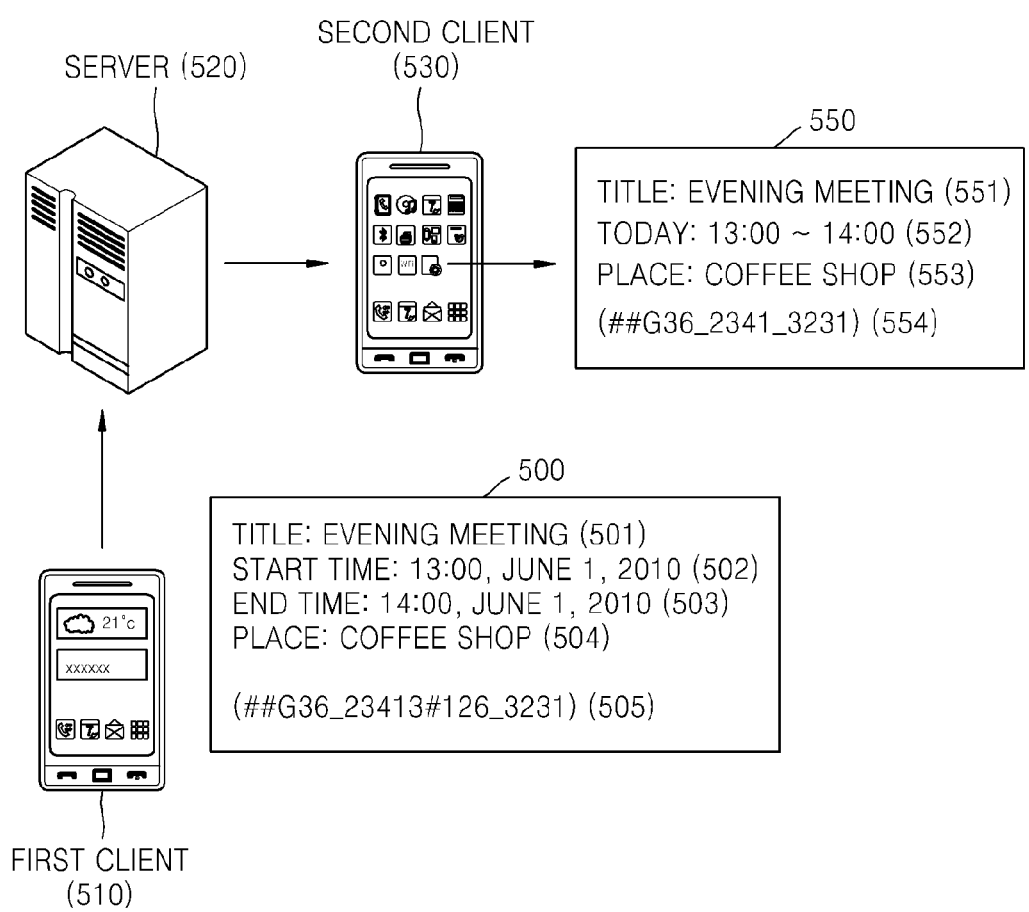
FIG. 5 is a diagram showing an example of processing data via a second client, which is unable to distinguish extended data from basic data, according to an implementation incorporating aspects of the disclosed teachings.

FIG. 5 is a diagram showing an example of processing data via a second client 530, which is unable to distinguish extended data from basic data, according to an implementation of the disclosed teachings.

First, a first client 510 registers predetermined information 500 to a server 520. The first server 510 may register the predetermined information 500 by using an open API distributed by the server 520. In FIG. 5, it is assumed that the open API defines three types of basic data, such that only data corresponding to a title, data corresponding to an appointed time, and data corresponding to an appointed place may be transmitted to or received from the server 520.

The first client 510 desires to transmit longitude and latitude data regarding an appointed place aside from types of basic data defined in the open API. The first client 510 converts the longitude and latitude data to comply with one of the three types of basic data and adds the converted longitude and latitude data to basic data. Referring to FIG. 5, the first client 510 adds the longitude and latitude data regarding the appointed place to basic data corresponding to the appointed place. Here, to distinguish extended data from basic data, the first client 510 adds a text string '##' to a location in front of the extended data.

Next, the second client 530 requests the predetermined information 500 stored in the server 520.

However, since the second client 530 is unable to distinguish extended data 554 from basic data 551, 552, and 553 in the predetermined information 500, the second client 530 is unable to process and provide the extended data 554.

Therefore, a text string 'coffee shop##G36_23413#126_3231' is provided in a screen image displayed by the second client 530 without indicating the geographical location.

Figure 6:
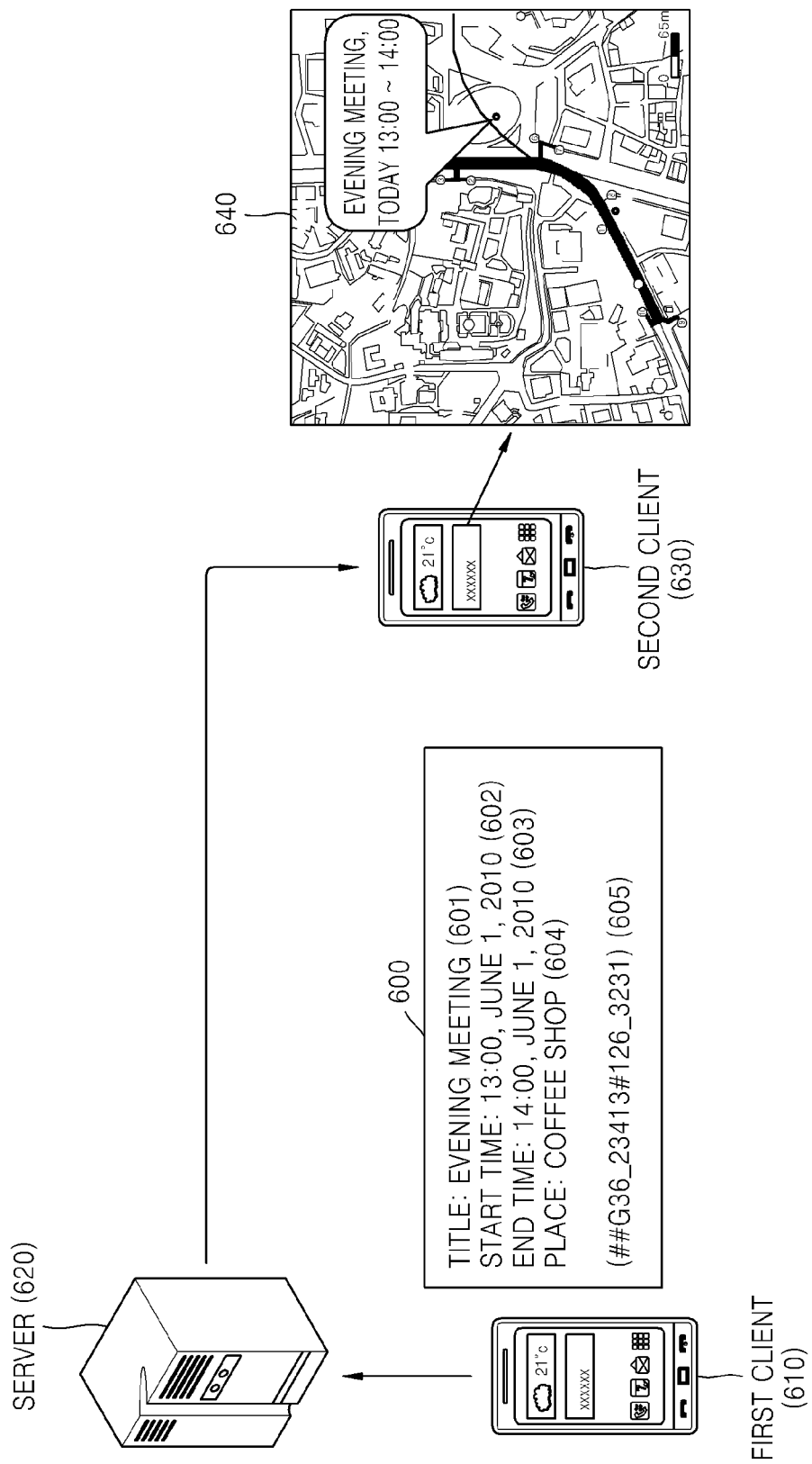
FIG. 6 is a diagram showing an example of processing data via a third client capable of distinguishing extended data from basic data, according to an implementation incorporating aspects of the disclosed teachings.

FIG. 6 is a diagram showing an example of processing data via a third client 630 capable of distinguishing extended data from basic data, according to an implementation of the disclosed teachings.

First, a first client 610 registers predetermined information 600 to a server 620. The process of registering the predetermined information 600 is the same as the process of registering the predetermined information 500 shown in FIG. 5, and thus a detailed description thereof will be omitted here.

A third client 630 may distinguish extended data 605 from basic data 601, 602, 603, and 604 in the predetermined information 600. Therefore, the third client 630 determines whether the extended data 605 is included in the predetermined information 600 and separates the basic data 601, 602, 603, and 604 and the extended data 605 from the predetermined information 600.

According to an implementation of the disclosed teachings, the basic data 601, 602, 603, and 604 and the extended data 605 may be processed by different modules. In this case, the third client 630 may determine a module for processing the extended data 605 based on the extended data 605.

The third client 630 processes the basic data 601, 602, 603, and 604 by using a first module, processes the extended data 605 by using a second module, and provides results thereof to a user.

In a screen image displayed by the third client 630, texts indicating a title, an appointed time, and an appointed place, which are results of processing the basic data 601, 602, 603, and 604, and a map 640 regarding the appointed place, which is a result of processing the extended data 605, are displayed together. According to an implementation of the disclosed teachings, the third client 630 may process the basic data 601, 602, 603, and 604 only or display results of processing the basic data 601, 602, 603, and 604 only in the case where a user makes no particular request, whereas the third client 630 may process the extended data 605 and display a result of processing the extended data 605 in the case where the user makes a particular request.

According to the disclosed teachings, in the case where the third client 630 is capable of separating basic data and extended data from data received from a server as shown in FIG. 6, various functions may be provided to a user by separating and processing the basic data and the extended data. On the contrary, even if the second client 530 is unable to separate basic data and extended data from data received from a server as shown in FIG. 5, the extended data complies with a data format defined in an open API, and thus the basic data may be processed and displayed without any error.

Figure 7:
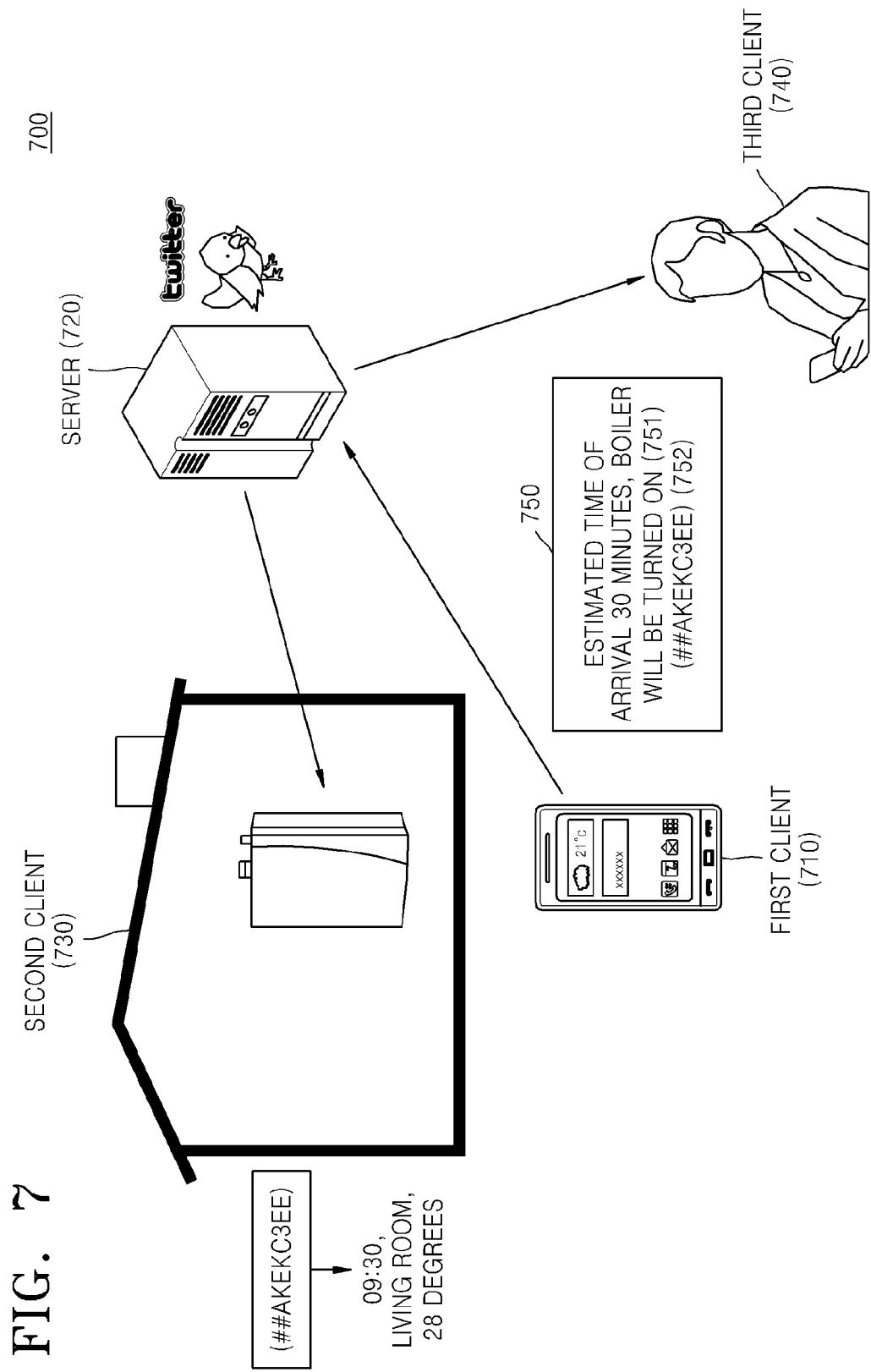
FIG. 7 is a diagram showing an example of a system for processing data according to an implementation incorporating aspects of the disclosed teachings.

FIG. 7 is a diagram showing an example of a system 700 for processing data according to another implementation of the disclosed teachings.

The system 700 according to the present implementation includes a first client 710, a server 720, a second client 730, and a third client 740. For convenience of explanation, it is assumed that the first client 710 is a cellular phone, the server 720 is a Twitter server, the second client 730 is a boiler, and the third client 740 is also a cellular phone.

The cellular phone 710 transmits a text string 750 to be viewed by followers by using an open API distributed by the Twitter server 720. The cellular phone 710 transmits the text string 750, which consists of a text 751 indicating that a user will arrive home after 30 minutes and a code 752 for operating the boiler 730, to the Twitter server 720.

According to an implementation of the disclosed teachings, a user may transmit the text string 750 to the Twitter server 720 by operating the cellular phone 710.

According to another implementation of the disclosed teachings, when a distance between a user and the user's home is within a critical value, the cellular phone 710 determines a geographical location of the user and environmental factors, such as a current temperature, and automatically decides whether to operate the boiler 730, a period of time for operating the boiler 730, and a temperature of the boiler 730. Next, if it is determined that it is necessary to operate the boiler 730, the cellular phone 710 transmits the text string 750 consisting of the text 751 and the code 752 for operating the boiler 730 to the Twitter server 720.

Since the text string 750 complies with formats defined in the open API, the Twitter server 720 will transmit the entire text string 750 to followers without any error. It is assumed that the boiler 730 and the cellular phone 740 are registered as followers of the user. Therefore, the Twitter server 720 transmits the text string 750 to the boiler 730 and the cellular phone 740.

The boiler 730 separates the basic data 751 and the extended data 752 from the text string 750. The boiler 730 includes a module for processing the extended data 752, and thus the extended data 752 is processed and the boiler 730 is operated.

The cellular phone 740 is unable to separate the basic data 751 and the extended data 752 from the text string 750. However, the cellular phone 740 includes a module for processing the text string 750 received from the Twitter server 720. Therefore, the cellular phone 740 may display the text string 750 including the basic data 751 and the extended data 752 in a screen image.

The user may confirm the status of the boiler 730 via a display screen of the cellular phone 740.

According to the disclosed teachings, operation of a device may be controlled without revealing an operating code of the device to a user. Furthermore, a function specific to a particular device may be added by using a Twitter server.

Figure 8:
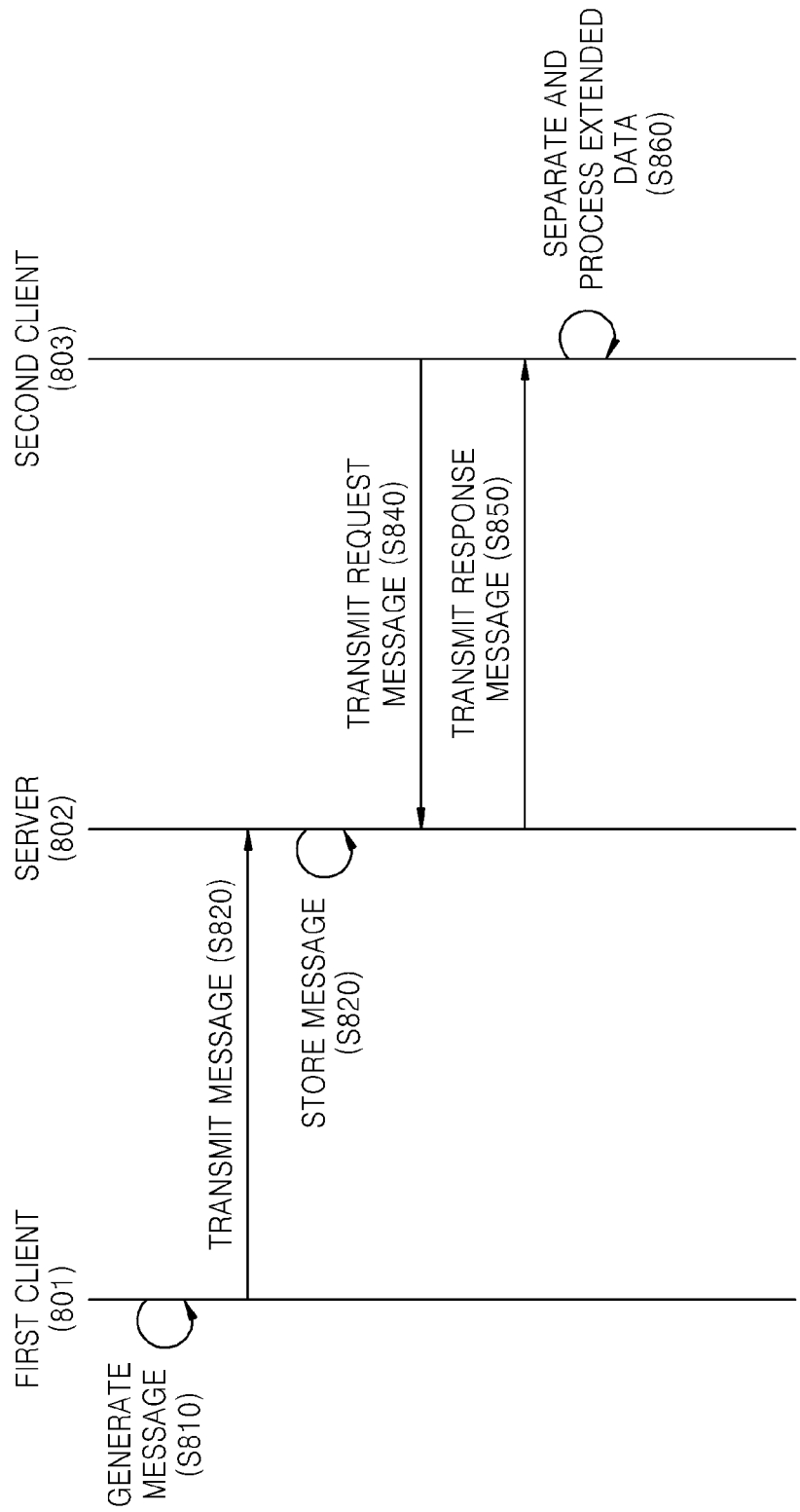
FIG. 8 is a flowchart showing a method of processing data via the data processing device according to an implementation incorporating aspects of the disclosed teachings.

FIG. 8 is a flowchart showing a method of processing data via the data processing device 200 according to an implementation of the disclosed teachings.

In operation S810, a first client 801 generates a message including basic data and extended data. The basic data is data required by a server to provide basic functions to clients and is data of a type defined in an open API distributed by the server. On the other hand, the extended data is data required for providing functions other than the basic functions and may be data of a type not defined in the open API. Therefore, the message may be generated by adding the extended data to the basic data of a type defined in the open API.

In operation S820, the first client 801 transmits the generated message to a server 802.

In operation S830, the server 820 binds the basic data and the extended data with respect to the first client 801 together and stores the basic data and the extended data.

In operation S840, a second client 803 transmits a request message for requesting transmission of the basic data and the extended data to the server 802.

In operation S850, the server 802 transmits a response message including the basic data and the extended data to the second client 803.

In operation S860, the second client 803 separates the basic data and the extended data from the response message. The separated basic data and the separated extended data may be processed by a first module and a second module. The first module processes the basic data and provides basic functions, whereas the second module processes the extended data and provides extended functions.

Figure 9:
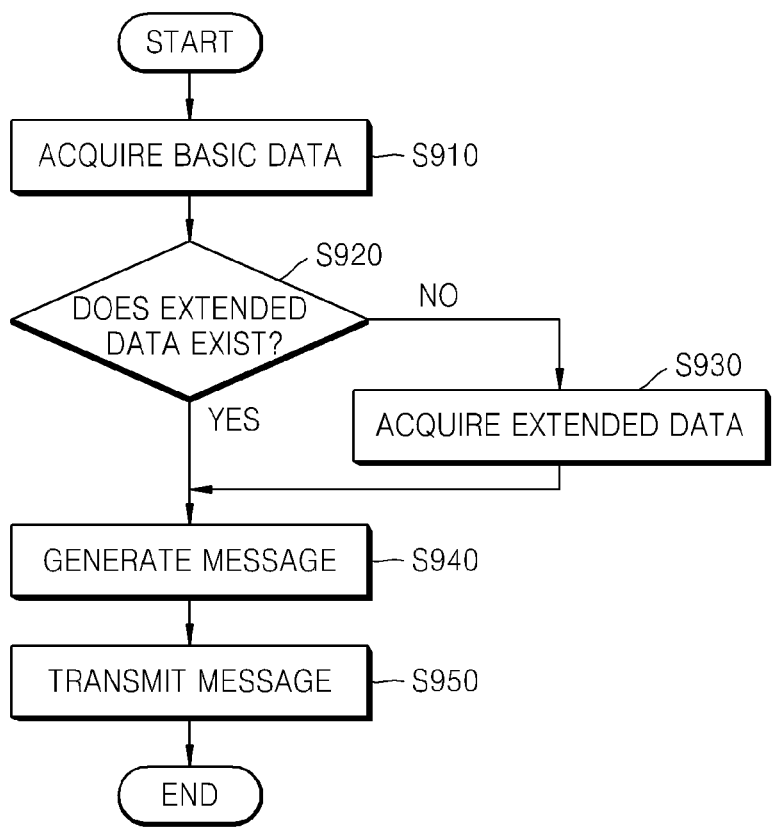
FIG. 9 is a flowchart showing a method of transmitting data according to an implementation incorporating aspects of the disclosed teachings.

FIG. 9 is a flowchart showing a method of transmitting data according to an implementation of the disclosed teachings.

In operation S910, basic data of a type defined in an open API is acquired. As described above, the basic data is data required by a server to provide basic functions.

In operation S920, it is determined whether extended data exists. The extended data is data required for providing extended functions other than the basic functions and may be data to be processed by a module that is different from a module for processing the basic data. According to an implementation of the disclosed teachings, the extended data may be data of a type not defined in the open API. If the extended data exists, operation S930 is performed. If not, operation S940 is performed.

In operation S930, the extended data is acquired.

In operation S940, a message including the basic data only or a message including both the basic data and the extended data is generated.

In operation S950, the generated message is transmitted to the server.

Figure 10:
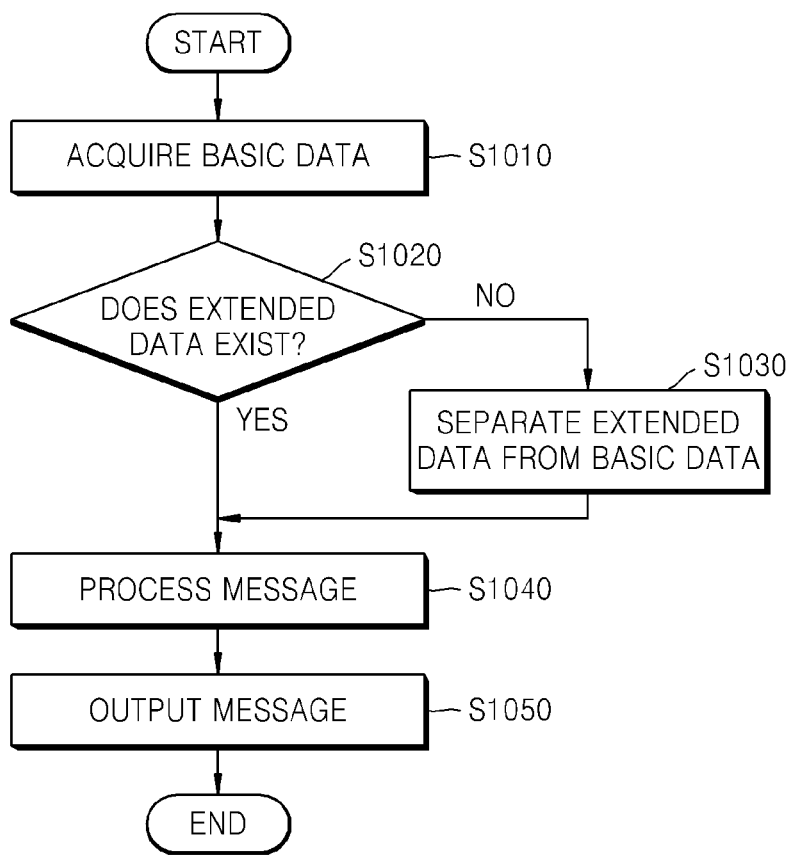
FIG. 10 is a flowchart showing a method of processing data according to an implementation incorporating aspects of the disclosed teachings.

FIG. 10 is a flowchart showing a method of processing data according to an implementation of the disclosed teachings.

In operation S1010, data is received from a server by using an open API.

In operation S1020, it is determined whether extended data is included in the received data. If the extended data is included in the received data, operation S1030 is performed to separate the extended data and the basic data from the received data.

In operation 1040, at least one of the basic data and the extended data is processed.

In operation S1050, the processed data is output.

The implementations of the disclosed teachings can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While the disclosed teachings have been particularly shown and described with reference to embodiments thereof, it will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description but by the appended claims, and all differences within the scope will be construed as being included in the present invention.

What is claimed is:

1. A method of transmitting data to a server by using an open application programming interface (API) including at least one field, the method comprising:
   acquiring basic data corresponding to a field from among the at least one field defined in the open API and extended data not corresponding to the field;
   appending the extended data to the basic data to generate a message;
   generating a Hypertext Transfer Protocol (HTTP) request message describing the message as a field value of the field; and
   transmitting the HTTP request message to the server,
   wherein the message comprises identification information indicating a position of the extended data in the message,
   wherein the open API is an API which is published by a service provider operating the server for providing a service related to the at least one field defined in the open API,
   wherein the basic data is processed by a first module and the extended data is processed by a second module, and
   wherein the message comprises identification information regarding the second module for processing the extended data.

2. The method of claim 1, wherein the appending comprises converting a data format of the extended data to a data format corresponding to the field; and
   appending the converted extended data to the basic data to generate the message.

3. A method of processing data received from a server by using an open API including at least one field, the method comprising:
   receiving, from the server, a Hypertext Transfer Protocol (HTTP) request message describing a message as data of a field from among the at least one field defined in the open API, the message comprising basic data corresponding to the field, extended data not corresponding to the field, and identification information indicating a position of the extended data in the message;
   obtaining the message from the HTTP request message based on the field;
   obtaining the basic data and the extended data from the message based on the identification information;
   performing a basic function defined in the open API based on the basic data, and an extended function not defined in the open API based on the extended data, wherein the open API is an API which is published by a service provider operating the server for providing a service related to the at least one field defined in the open API,
   wherein the basic data is processed by a first module and the extended data is processed by a second module, and
   wherein the message comprises identification information regarding the second module for processing the extended data.

4. A device for transmitting data to a server by using an open application programming interface (API) including at least one field, the device comprising:
   a memory configured to store programmed instructions; and
   a processor coupled to the memory, the processor being configured to execute the programmed instructions stored in the memory to perform a method of
   acquiring basic data corresponding to a field from among the at least one field defined in the open API and extended data not corresponding to the field;
   appending the extended data to the basic data to generate a message;

generating a Hypertext Transfer Protocol (HTTP) request message describing the message as a field value of the field; and transmitting the HTTP request message to the server;

wherein the message comprises identification information indicating a position of the extended data in the message, wherein the open API is an API which is published by a service provider operating the server for providing a service related to the at least one field defined in the open API, wherein the basic data is processed by a first module and the extended data is processed by a second module, and wherein the message comprises identification information regarding the second module for processing the extended data.

5. The device of claim 4, wherein the appending comprises converting a data format of the extended data to a data format corresponding to the field, and appending the converted extended data to the basic data to generate the message.

6. A device for processing data received from a server by using an open application programming interface (API) including at least one field, the device comprising:

a memory configured to store programmed instructions; and a processor coupled to the memory, the processor being configured to execute the programmed instructions stored in the memory to perform a method of:

receiving, from the server, a Hypertext Transfer Protocol (HTTP) request message describing a message as data of a field from among the at least one field defined in the open API, the message comprising basic data corresponding to the field, extended data not corresponding to the field, and identification information indicating a position of the extended data in the message;

obtaining the message from the HTTP request message based on the field;

obtaining the basic data and the extended data from the message based on the identification information, and performing a basic function defined in the open API based on the basic data, and an extended function not defined in the open API based on the extended data, wherein the open API is an API which is published by a service provider operating the server for providing a service related to the at least one field defined in the open API, wherein the basic data is processed by a first module and the extended data is processed by a second module, and wherein the message comprises identification information regarding the second module for processing the extended data.

7. A non-transitory computer readable recording medium having recorded thereon instructions which, when executed, cause a computer to perform a method of transmitting data to a server by using an open application programming interface (API) including at least one field, the method comprising:

acquiring basic data corresponding to a field from among the at least one field defined in the open API and extended data not corresponding to the field;

appending the extended data to the basic data to generate a message;

generating a Hypertext Transfer Protocol (HTTP) request message describing the message as a field value of the field; and transmitting the HTTP request message to the server, wherein the message comprises identification information indicating a position of the extended data in the message, wherein the open API is an API which is published by a service provider operating the server for providing a service related to the at least one field defined in the open API, wherein the basic data is processed by a first module and the extended data is processed by a second module, wherein the message comprises identification information regarding the second module for processing the extended data.

* * * * *